(12) United States Patent
Bush et al.

(10) Patent No.: US 8,750,118 B2
(45) Date of Patent: Jun. 10, 2014

(54) SCALE-FREE ROUTING TOPOLOGY FOR A POWER NETWORK

(75) Inventors: Stephen Francis Bush, Latham, NY (US); Michael Joseph Mahony, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/173,588

(22) Filed: Jun. 30, 2011

(65) Prior Publication Data
US 2013/0003603 A1    Jan. 3, 2013

(51) Int. Cl.
*H04L 12/26* (2006.01)

(52) U.S. Cl.
USPC ............ 370/235; 370/319; 370/351; 370/392

(58) Field of Classification Search
USPC ......... 370/319, 392, 389, 252–255, 351, 235; 709/241, 238, 223, 243; 455/465; 375/259, 258, 220, 276
See application file for complete search history.

(56) References Cited

U.S. PATENT DOCUMENTS

| | | | | |
|---|---|---|---|---|
| 7,839,899 | B2 * | 11/2010 | van Greunen et al. | 370/503 |
| 7,852,837 | B1 * | 12/2010 | Au et al. | 370/389 |
| 7,961,740 | B2 * | 6/2011 | Flammer et al. | 370/400 |
| 8,121,740 | B2 * | 2/2012 | Yang et al. | 700/292 |
| 8,279,870 | B2 * | 10/2012 | Flammer et al. | 370/392 |
| 8,311,063 | B2 * | 11/2012 | van Greunen et al. | 370/503 |
| 2004/0172399 | A1 | 9/2004 | Saffre | |
| 2004/0236620 | A1 * | 11/2004 | Chauhan et al. | 705/9 |
| 2007/0291663 | A1 | 12/2007 | Dixit et al. | |
| 2007/0298821 | A1 | 12/2007 | Bush | |
| 2010/0157838 | A1 * | 6/2010 | Vaswani et al. | 370/252 |
| 2011/0254557 | A1 * | 10/2011 | Makki et al. | 324/418 |

OTHER PUBLICATIONS

Jianyang Zeng, Wen-Jing Hsu, and Suiping Zhou; Construction of Scale-Free Networks with Partial Information; Computing and Combinatorics: Lecture Notes in Computer Science; 2005; vol. 3595 pp. 146-155.

Guclu, H; Kumari, D; Yuksel, M; Ad-hoc Limited Scale-Free Models for Unstructured Peer-to-Peer Networks; Eighth International Conference on Peer-to-Peer Computing, 2008. P2P '08.; Sep. 8-11, 2008; pp. 160-169.

F Saffre, H Jovanovic, C Hoile and S Nicolas; Scale-Free Topology for Pervasive Networks; BT Technology Journal; Jul. 2004; vol. 22 Issue: 3 p. 200-208.

* cited by examiner

*Primary Examiner* — Robert Wilson
*Assistant Examiner* — Sai Aung
(74) *Attorney, Agent, or Firm* — Robert M. McCarthy

(57) ABSTRACT

A scale free communication network in a power network is provided. The scale free communication network comprises a plurality of distribution devices communicatively coupled to each other in a power network that include a protection device and a controller coupled to each of the plurality of distribution devices in the power network. The controller identifies a plurality of isolated distribution devices. The controller further restores the plurality of isolated distribution devices in the power network by automatically activating the tie-switch in the power network. The controller also computes reliability indicators for each of the restored distribution device in the power network. Furthermore, the controller identifies critical distribution devices in the power network based on the computed reliability indicators and establishes a scale free communications network within the power network based on the identified critical distribution devices.

19 Claims, 6 Drawing Sheets

SCALE-FREE ROUTING TOPOLOGY FOR A POWER NETWORK

BACKGROUND

A smart grid delivers electricity to consumers while leveraging digital communication and control technologies to minimize financial cost, save energy, and increase reliability. If designed properly, the smart grid will have a significant impact on improving a wide range of aspects in the electric power generation and distribution industry. Examples include self-healing, high-reliability, resistance to cyber-attack, accommodation of a wide variety of types of distributed generation and storage mechanisms, optimized asset allocation, and minimization of operation and maintenance expenses as well as high-resolution market control that incorporates advanced metering and demand-response.

An important component in operation of smart grids is fault detection, isolation, and restoration of the smart grid. Today, most of the distribution devices in a power network are communicatively coupled either in a star, mesh or a ring topology. The aforementioned communication topologies leads to a delay in detection of faults that occur at the distribution devices located far from the substation. The delay in detection of the fault results in less than optimal isolation of faults and a larger than necessary number of consumers experiencing service outages during the faults. Furthermore, restoration of power networks operating on these communication topologies is delayed and inefficient as these communication topologies lead to undesired congestion, collisions due to simultaneous transmissions and undue computations and management of distribution devices within the power network.

For these and other reasons, there is a need for embodiments of the invention.

BRIEF DESCRIPTION

A scale free communication network in a power network is provided. The scale free communication network includes a plurality of distribution devices communicatively coupled to each other in a power network that include a protection device and a controller coupled to each of the plurality of distribution devices in the power network. The controller identifies a plurality of isolated distribution devices. The controller further restores the plurality of isolated distribution devices in the power network by automatically activating the tie-switch in the power network. The controller also computes reliability indicators for each of the restored distribution device in the power network. Furthermore, the controller identifies critical distribution devices in the power network based on the computed reliability indicators and establishes a scale free communications network within the power network based on the identified critical distribution devices.

DRAWINGS

These and other features and, aspects of the present invention will become better understood when the following detailed description is read with reference to the accompanying drawings in which like characters represent like parts throughout the drawings, wherein.

DETAILED DESCRIPTION

Embodiments of the present invention include a scale free communication network. The scale free communication network in a power network comprises a plurality of distribution devices communicatively coupled to each other in a power network that include a protection device and a controller coupled to each of the plurality of distribution devices in the power network. The controller identifies a plurality of isolated distribution devices. The controller restores the plurality of isolated distribution devices in the power network by automatically opening identified distribution devices and activating the tie-switch in the power network. The controller also identifies a plurality of restored distribution devices and computes reliability indicators for each of the restored distribution device in the power network. Furthermore, the controller identifies critical distribution devices in the power network based on the computed reliability indicators and establishes a scale free communications network within the power network based on the identified critical distribution devices.

Power networks include multiple distribution devices electrically coupled to each other over long distances for transmission and distribution of power. The distribution devices in the power network communicate with each other based on a communication topology via a preferred medium of communication. A star, ring or a mesh topology can be provided for communication between the distribution devices. In operation, during a fault, the distribution devices send a fault message to the other distribution devices according to the topology in which the distribution devices are communicatively coupled. However, the communication topologies may result in undesired delay and power outage.

A communications network that incorporates the reliability of a mesh network with the reduced complexity of a star or ring network can be used in the power network. In this arrangement, the redundant communication paths between each node are scaled back based on specified reliability requirements, such a network architecture can be referred to as a scale free network. This communication topology for the power networks is described below.

Figure 1:
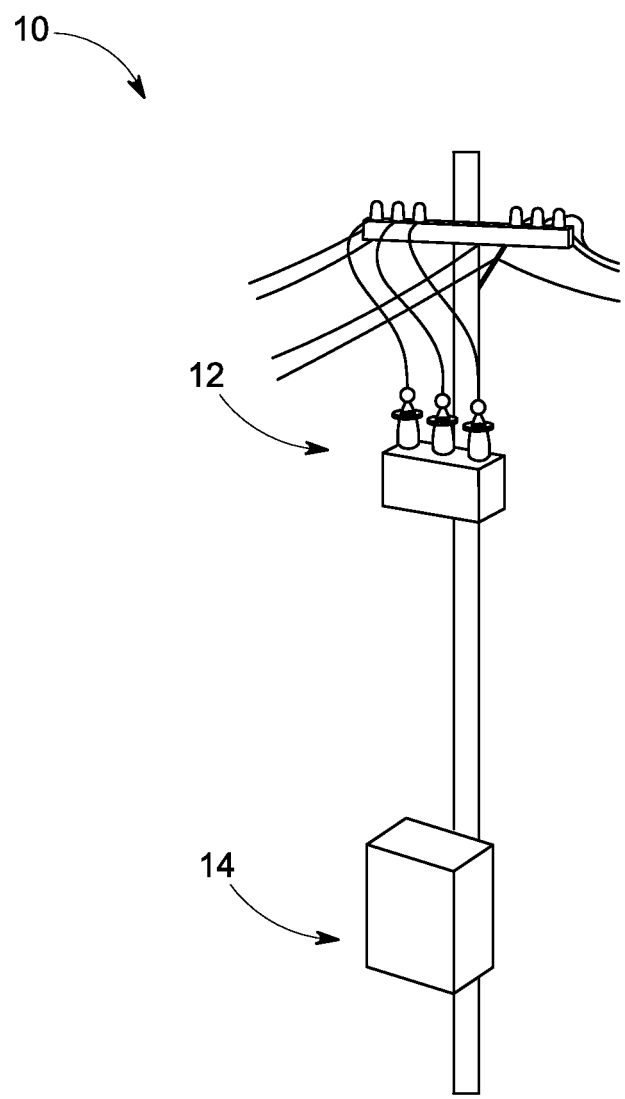
FIG. 1 is a diagrammatical representation of a distribution device in accordance with an exemplary embodiment of the invention.

FIG. 1 is a diagrammatical representation of a distribution device 10 in accordance with an exemplary embodiment of the invention. The distribution device 10 includes a protection device 12 and a controller 14 mounted on the distribution device 10. In one embodiment, the distribution device 10 may include an electrical pole. In another embodiment, the protection device 12 includes a recloser, a relay, distance protection devices, differential protection devices, phasor based protection devices, current limiting devices and high power electronic devices. In other embodiments, the controller 14 can be integrated with the protection device 12. The controller is responsible for communicating within a power network and controls the operations of the protection device based on such communications.

Figure 2:
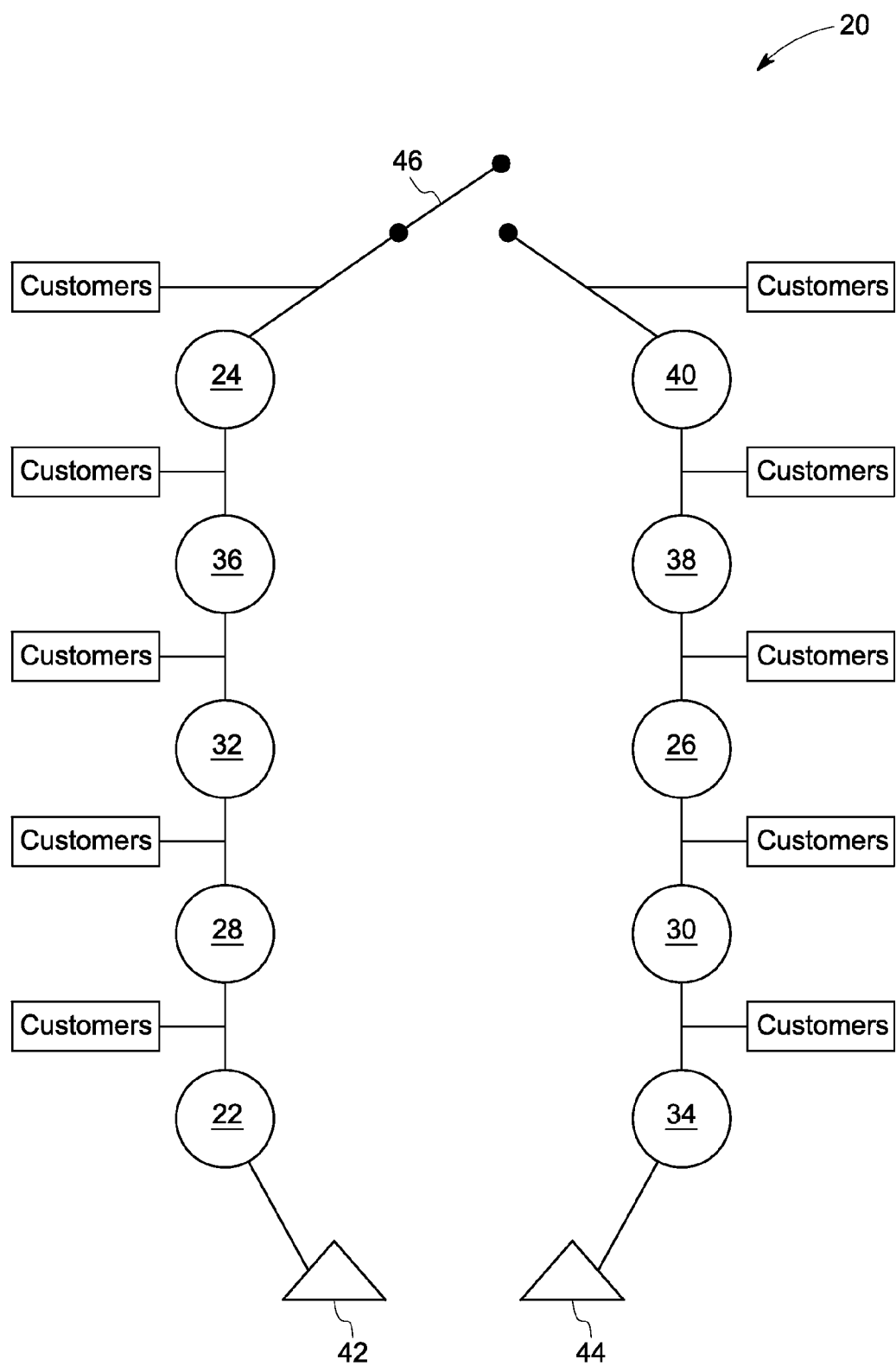
FIG. 2 is an exemplary representation of a power network including a plurality of distribution devices coupled to each other in accordance with an exemplary embodiment of the invention.

FIG. 2 is an exemplary representation of a power network 20 including a plurality of distribution devices coupled to each other in accordance with an exemplary embodiment of the invention. The power network 20 includes distribution devices 22, 24, 26, 28, 30, 32, 34, 36, 38, 40 electrically coupled to each other. The power network 20 further includes substations 42 and 44 that are electrically coupled to all the distribution devices in the power network 20 via the distribution devices 22 and 34 and a tie-switch 46 is connected to the power network via the distribution devices 24 and 40 electrically coupled at its two ends. In one embodiment, the tie-switch includes a distribution device. During normal operation, the tie-switch is in a non-conducting state, the substations 42 and 44 feed power to the power network 20. Furthermore, when the power network 20 is first deployed and commissioned, the distribution devices 22, 24, 26, 28, 30, 32, 34, 36, 38, 40 automatically establish a scale free communication network to communicate with each other in the power network 20. The method for establishing the scale free communication network in the power network 20 is described below in detail.

Figure 3:
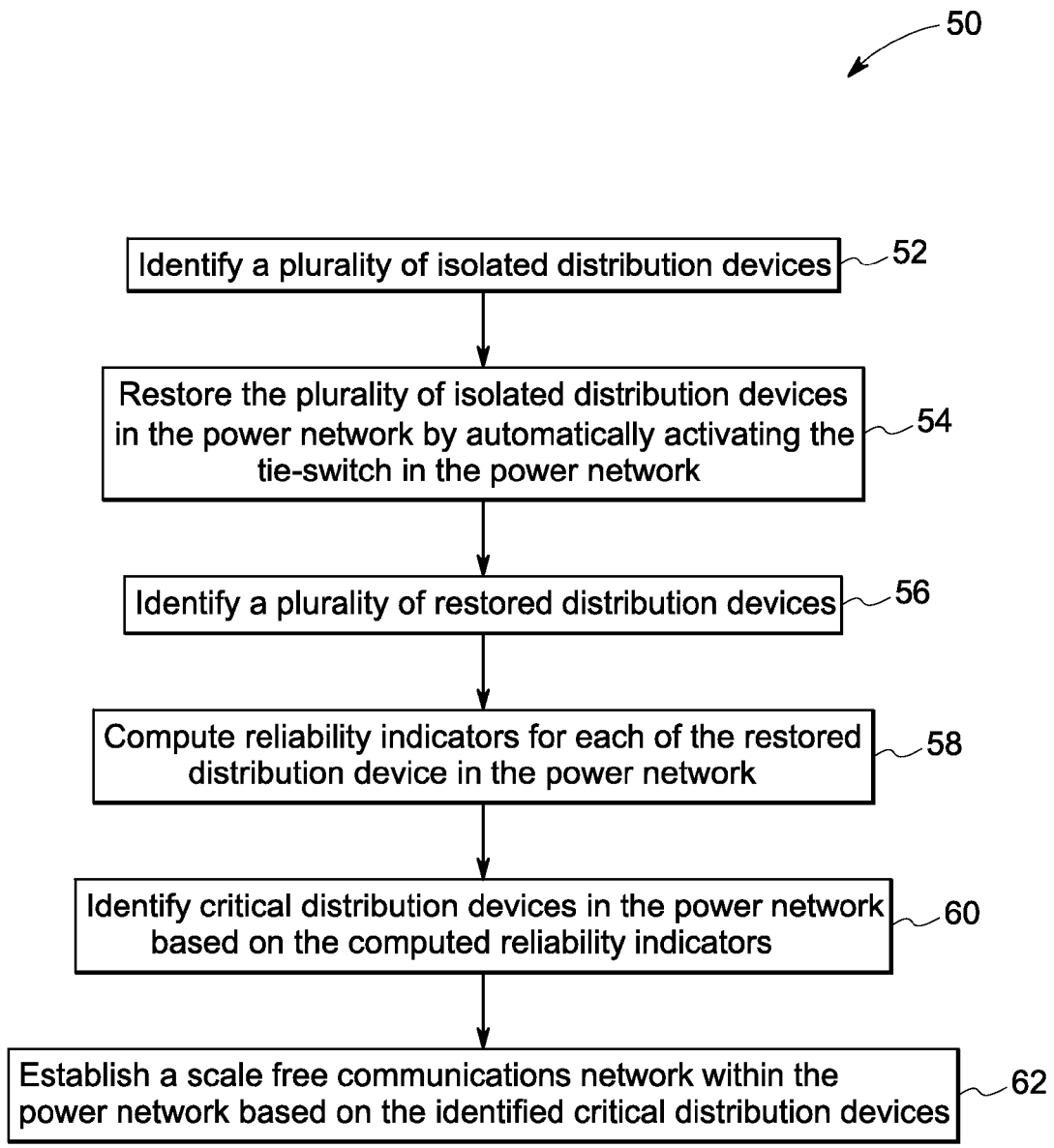
FIG. 3 is a flow chart representing the steps involved in a method for automatically establishing a scale free communications network within the plurality of distribution devices in the power network in accordance with an embodiment of the invention.

FIG. 3 is a flow chart representing the steps involved in a method 50 for automatically establishing a scale free network within the plurality of distribution devices in the power network in accordance with an embodiment of the invention. The method 50 includes identifying isolated distribution devices in the power network in step 52. In one embodiment, the isolated distribution devices are identified by computing a graph Laplacian matrix of the distribution devices in the power network. In another embodiment, eigenvalues and eigenvectors of each of the distribution devices are determined and provided in the graph Laplacian matrix. In yet another embodiment, the eigenvalues and the corresponding eigenvectors are examined to identify the isolated distribution devices. In step 54, the isolated distribution devices are automatically restored by activating the tie switch in the power network. In one embodiment, the unrestored isolated distribution devices are restored manually. The restored distribution devices are identified in step 56. In one embodiment, the restored distribution devices are identified by computing a graph Laplacian matrix of the restored distribution devices in the power network. In another embodiment, eigenvalues and eigenvectors of each of the restored distribution devices are determined and provided in the graph Laplacian matrix. In yet another embodiment, the eigenvalues and the corresponding eigenvectors of the restored distribution devices are examined to identify the restored distribution devices. Subsequently, the reliability indicators for each of the distribution devices in the power network are computed in step 58. In an exemplary embodiment, the computed reliability indicators include system average interruption duration index (SAIDI), system average interruption frequency index (SAIFI), momentary average interruption frequency index (MAIFI), customer average interruption duration index (CAIDI) and customer average interruption frequency index (CAIFI). In step 60, critical distribution devices are identified by comparing the computed reliability indicators of each of the distribution devices. As used herein, criticalness of a distribution device is directly proportional to the impact of the distribution device on the electric power network reliability. If the impact of the distribution device is higher, the criticalness of the distribution device is higher. In one embodiment, ranks are provided for each of the distribution devices based on the comparison of the computed reliability indicators. In another embodiment, the ranks of the distribution devices are provided for corresponding values of the reliability indicators in a descending order. For example, a distribution device with higher SAIDI will be assigned a higher rank. Subsequently, a scale free communication network is established within the power network based on the identified critical distribution devices in step 62. In one embodiment an optimum number of communications paths dedicated to a distribution device is calculated based on the impact to overall power system reliability by the protection device of the distribution devices. In an exemplary embodiment, a distribution device is assigned a larger number of communications links if its protection device has a larger impact on electric power system reliability.

Figure 4:
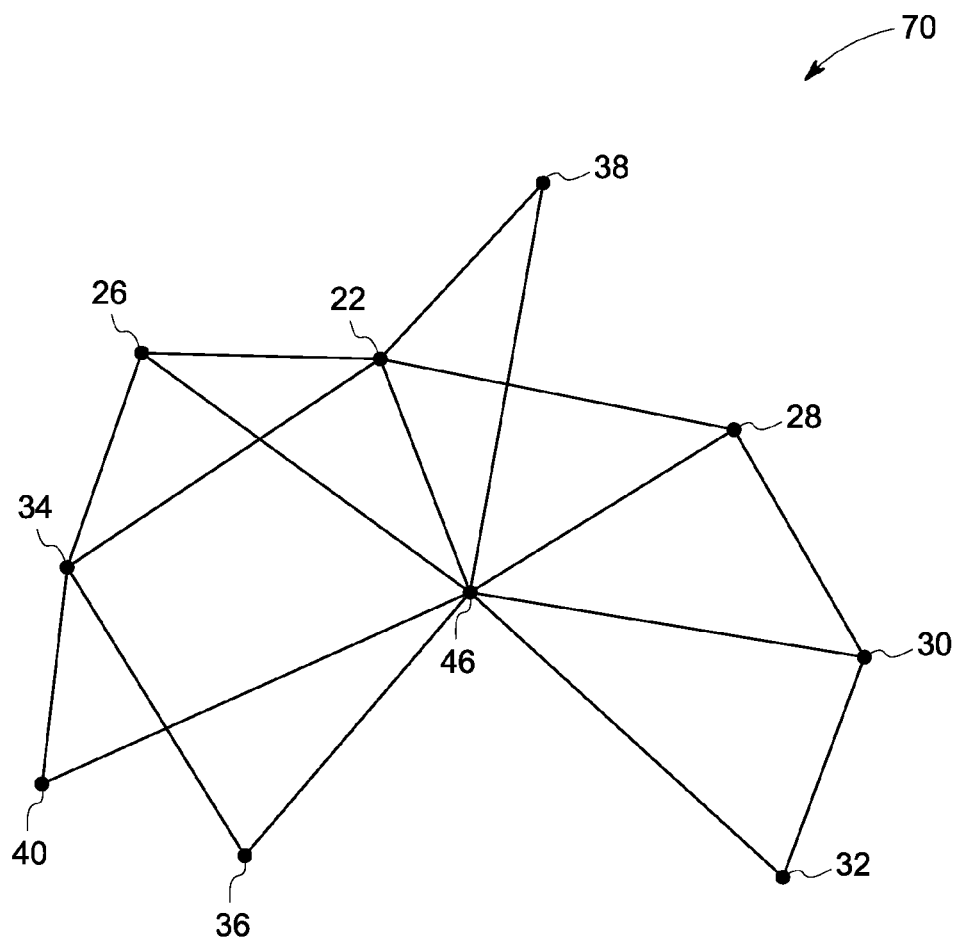
FIG. 4 is an exemplary schematic representation of a scale free communication network provided in the power network in accordance with an embodiment of the invention.

FIG. 4 is an exemplary schematic representation of a scale free communication network 70 provided in the power network 20 in accordance with an embodiment of the invention. The distribution devices 22, 26, 28, 30, 32, 34, 36, 38, 40 and tie-switch 46 are communicatively coupled to form the scale free communication network 70 with a preferred medium of communication according to the above mentioned method. In one embodiment, the tie-switch 46 includes the distribution device. As used herein, the term "scale free network" is defined as a network whose degree distribution follows a power law, at least asymptotically, that is, the fraction P(k) of nodes in the network having k connections to other nodes goes for large values of k as $P(k) \sim ck^{-\gamma}$ where c is a normalization constant and γ is a parameter whose value is typically in the range $2<\gamma<3$, although occasionally it may lie outside these bounds. In one embodiment, the preferred medium of communication includes private and public wired and wireless networks, and any combination thereof. Examples of such networks include WIFI, WIMAX, power line carrier, land line telephony, electric utility radio or cellular telephony. For example, taking the distribution devices 22, 34 and 46 in consideration, the tie-switch 46 possesses the highest value of the reliability indicators and would be assigned a first rank. The distribution device 22 possesses a medium value of the reliability indicators and is assigned a second rank. The distribution device 34 possesses a lowest value among the three distribution devices 22, 46 and 34 and would be assigned a third rank. Based on the assigned ranks of the distribution devices, the criticality of the distribution device is identified such as distribution device 24 being the most critical. Subsequently, highest redundancy is provided to the distribution device 46 followed by the distribution device 22 and 34 respectively. As used herein, the term "redundancy" is defined as the number of communication links through which a distribution device is capable of communicating simultaneously with other distribution devices.

For example, during normal operation, distribution device 22 communicates with the distribution device 30 via the distribution device 28. However, in case of a communication fault at the distribution device 28, the distribution device 22 can reach the distribution device 30 via the distribution device 46 with only one hop. As used herein, the term "communication fault" relates to a fault that has occurred in the communication system of the distribution device and excludes any power fault described below. As used herein, the term "hop" is defined as a single communication path provided between two distribution devices. Therefore, the distribution device 22 employs an alternative route to transmit the message that reaches the distribution device 30 with the least number of hops. As understood, the most critical distribution device will have the highest redundancy and would be able to communicate with most number of distribution devices in the communication network resulting in highest number of alternative paths to reach a particular distribution device.

Figure 5:
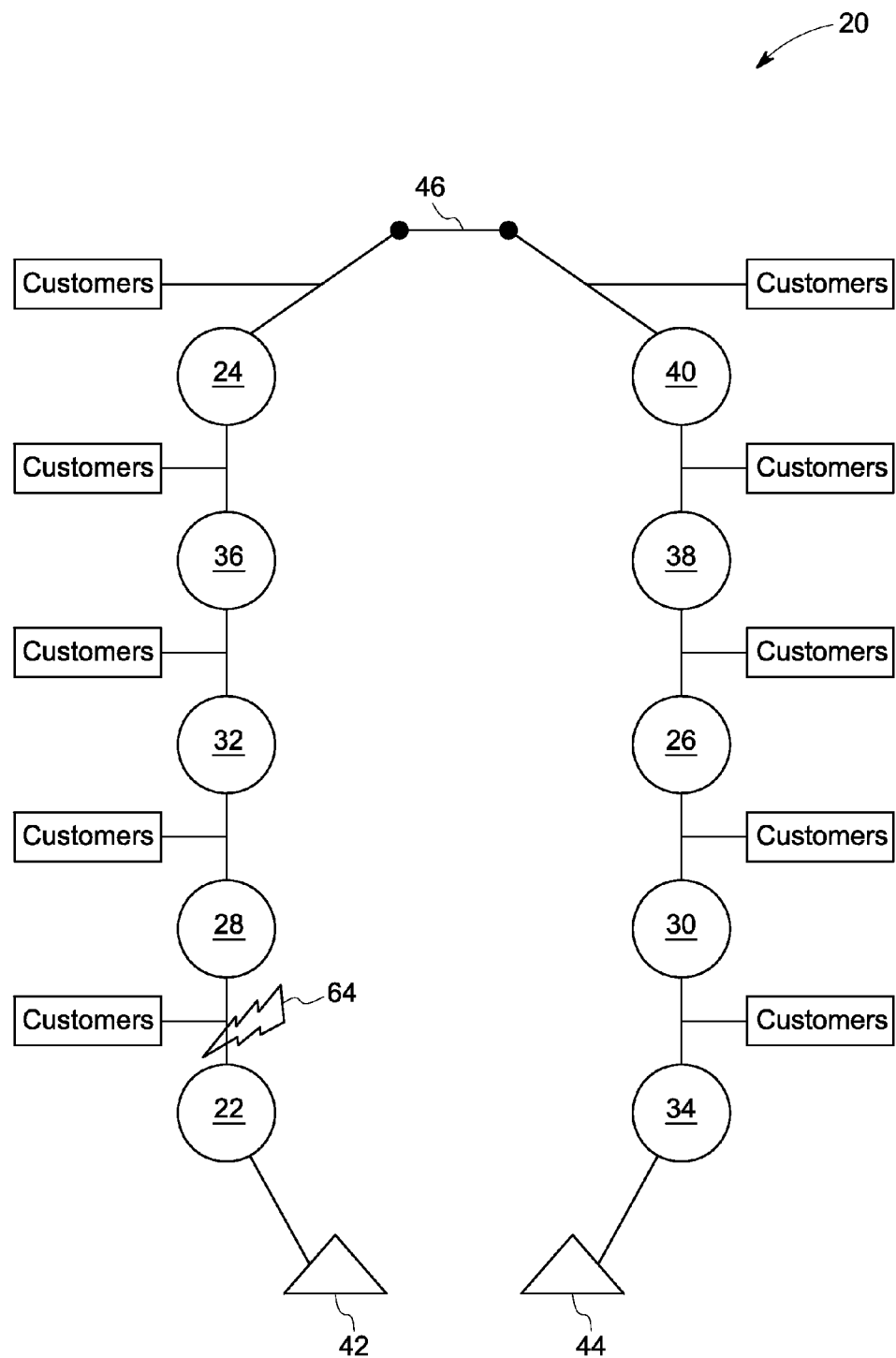
FIG. 5 is an exemplary schematic representation of the power network including a power fault in accordance with an embodiment of the invention.

FIG. 5 is an exemplary schematic representation of the power network 20 including a power fault 64 in accordance with an embodiment of the invention. In normal operation, tie switch 46 is in an open state. As used herein, the term "power fault" relates to a fault that occurs in the power network, in which one or more distribution devices operate to isolate the fault, resulting in a loss of power downstream to other distribution devices in the power network, resulting in an outage. For example, in operation, the power fault 64 occurs between the distribution device 22 and 28. The substation 42 is feeding the distribution device 22 but the distribution device 22 has interrupted the flow of power downstream to the faulted section that leads to an outage and interruption to the customers downstream. Consequently, to restore power to customers located on the healthy section of the distribution feeder, between distribution device 28 and the tie switch 46, the distribution device 22 communicates with the distribution device 28 to open and subsequently communicates with tie-switch 46 to close. The closed tie-switch 46 enables the power transfer from the substation 44 to feed the customers located between distribution devices 24, 28, 32 and 36 suffering from the outage. The communication between distribution devices 22, 28 and 46 can be understood better with respect to FIG. 6 described below.

Figure 6:
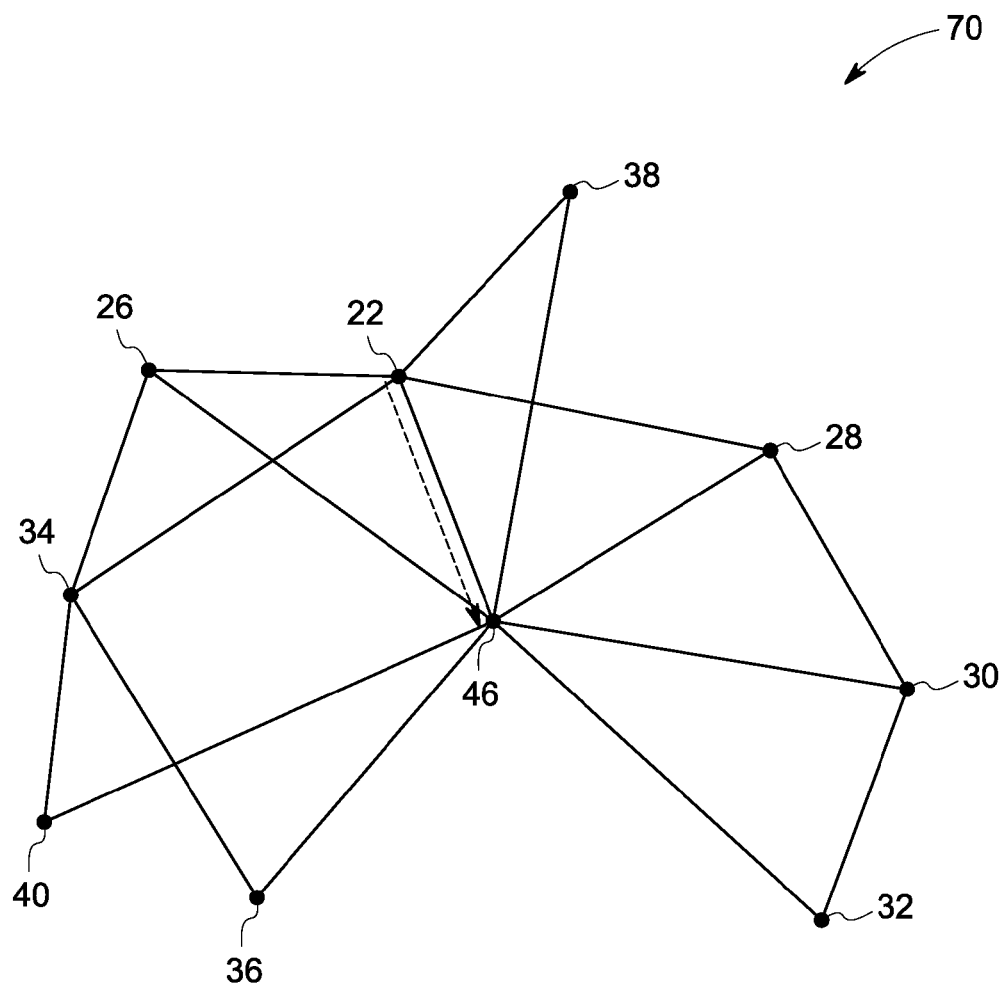
FIG. 6 is an exemplary schematic representation of the scale free communication network provided in the power network depicting communication between the distribution devices in case of the power fault in accordance with an embodiment of the invention.

FIG. 6 is the exemplary schematic representation of the scale free communication network 70 provided in the power network 20 depicting communication between the distribution devices 22 and 46 in accordance with an embodiment of the invention. During the above mentioned power fault 64, the distribution device 22 directly communicates with the tie-switch 46 without any hops and undesired delay. Therefore, the supply of power to the distribution devices 46, 28, 32 and 36 is restored instantly resulting in minimum interruption and maximum reliability.

The various embodiments of the method described above provide an efficient way to minimize outage and maximize reliability in a power network. Generally, the method described above automatically establishes a new scale free communication topology that allows the distribution devices in the power network to communicate with each other in minimum number of hops and minimum delay. Furthermore, the scale free communication topology identifies critical distribution devices and provides a plurality of communication links to the critical distribution devices for communicating with the other distribution devices in the power network resulting in minimum outage and least number of customers being affected by the outage.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for communicating within a power network, comprising:
   identifying a plurality of isolated distribution devices wherein identifying the plurality of isolated distribution devices comprises computing a graph Laplacian matrix of the distribution devices;
   restoring the plurality of isolated distribution devices in the power network by automatically activating a tie-switch in the power network;
   computing reliability indicators for each of the distribution devices in the power network;
   identifying critical distribution devices in the power network based on the computed reliability indicators;
   establishing a scale free communications network within the power network based on the identified critical distribution devices, wherein establishing the scale free communication network comprises forming a communication network with a degree distribution based on a power law; and
   identifying the plurality of restored distribution devices further comprises examining the eigenvalues of the graph representation of the restored distribution devices.

2. The method of claim 1, wherein identifying the plurality of isolated distribution devices comprises determining eigenvalues and eigenvectors of the graph representation of the distribution devices.

3. The method of claim 1, wherein identifying the plurality of isolated distribution devices comprises examining the eigenvalues of the distribution devices.

4. The method of claim 1, wherein identifying the plurality of isolated distribution devices comprises examining the eigenvectors of the corresponding eigenvalues of the distribution devices.

5. The method of claim 1, wherein identifying the plurality of restored distribution devices comprises computing a graph Laplacian matrix of the restored distribution devices.

6. The method of claim 1, wherein identifying the plurality of restored distribution devices comprises determining eigenvalues and eigenvectors of the graph representation of the restored distribution devices.

7. The method of claim 1, wherein identifying the plurality of isolated distribution devices comprises examining the eigenvectors of the corresponding eigenvalues of the restored distribution devices.

8. The method of claim 1, wherein computing reliability indicators comprises computing system average interruption duration index (SAIDI), system average interruption frequency index (SAIFI), momentary average interruption frequency index (MAIFI), customer average interruption duration index (CAIDI) and customer average interruption frequency index (CAIFI) independently.

9. The method of claim 1, wherein identifying the critical distribution devices comprises comparing the computed reliability indicators of each of the restored distribution devices.

10. The method of claim 1, wherein identifying the critical distribution devices comprises providing ranks to each of the restored distribution devices based on an impact of the critical distribution devices on the computed reliability indicators.

11. The method of claim 10, wherein providing ranks to each of the restored distribution devices comprises providing ranks corresponding to the values of the reliability indicators in a descending order.

12. A system comprising:
a plurality of distribution devices communicatively coupled to each other in a power network;
a protection device coupled to each of the plurality of distribution devices configured to transmit power in the power network; and
a controller coupled to each of the plurality of distribution devices configured to: identify a plurality of isolated distribution devices;
wherein the plurality of isolated distribution devices comprises computing a graph Laplacian matrix of the distribution devices;
restore the plurality of isolated distribution devices in the power network
by automatically activating a tie-switch in the power network; identify a plurality of restored distribution devices;
compute reliability indicators for each of the restored distribution device in the power network;
identify critical distribution devices in the power network based on the computed reliability indicators; and
establish a scale free communications network within the power network based on the identified critical distribution devices, wherein the scale free communication network comprises a communication network with a degree distribution based on a power law; and
identify the plurality of restored distribution devices further comprises examining the eigenvalues of the graph representation of the restored distribution devices.

13. The system of claim 12, wherein the distribution device comprises a utility pole or equipment vault.

14. The system of claim 12, wherein the power network comprises a transmission network or a distribution network.

15. The system of claim 12, wherein the plurality of distribution devices are communicatively coupled to each other in a preferred mode of communication.

16. The system of claim 15, wherein the preferred communication mode comprises private and public wired and wireless networks, and any combination thereof.

17. The system of claim 16, wherein the private and public wired and wireless networks comprises WIFI, WIMAX, power line carrier, land line telephony, electric utility radio or cellular telephony.

18. The system of claim 12, wherein the protection device comprises a recloser.

19. A non-transitory computer-readable medium comprising computer-readable instructions of a computer program that, when executed by
a processor, cause the processor to perform a method, the method comprising: identifying a plurality of isolated distribution devices wherein identifying the plurality of isolated distribution devices comprises computing a graph Laplacian matrix of the distribution devices;
restoring the plurality of isolated distribution devices in the power network by automatically activating a tie-switch in the power network;
identifying a plurality of restored distribution devices;
computing reliability indicators for each of the restored distribution device in the power network;
identifying critical distribution devices in the power network based on the computed reliability indicators; and
establishing a scale free communications network within the power network based on the identified critical distribution devices, wherein establishing the scale free communication network comprises forming a communication network with a degree distribution based on a power law; and
identifying the plurality of restored distribution devices further comprises examining the eigenvalues of the graph representation of the restored distribution devices.

\* \* \* \* \*